(12) United States Patent
El Eglick

(10) Patent No.: US 10,287,765 B1
(45) Date of Patent: May 14, 2019

(54) TOILET TANK TOP COVER

(71) Applicant: Dan El Eglick, Eilat (IL)

(72) Inventor: Dan El Eglick, Eilat (IL)

( * ) Notice: Subject to any disclaimer, the term of this patent is extended or adjusted under 35 U.S.C. 154(b) by 0 days.

(21) Appl. No.: 15/871,106

(22) Filed: Jan. 15, 2018

(30) Foreign Application Priority Data

Nov. 13, 2017 (IL) .......................................... 255623

(51) Int. Cl.
| | |
|---|---|
| *E03D 1/00* | (2006.01) |
| *E03D 9/02* | (2006.01) |
| *E03D 9/03* | (2006.01) |
| *G01F 11/16* | (2006.01) |

(52) U.S. Cl.
CPC ............... *E03D 9/037* (2013.01); *E03D 1/00* (2013.01); *E03D 2009/028* (2013.01); *G01F 11/16* (2013.01)

(58) Field of Classification Search
CPC ...................................................... E03D 9/037
USPC ....................................................... 4/227.1
See application file for complete search history.

(56) References Cited

U.S. PATENT DOCUMENTS

| | | | | |
|---|---|---|---|---|
| 4,490,861 | A * | 1/1985 | Dolan | E03D 9/038 |
| | | | | 4/227.2 |
| 4,635,302 | A * | 1/1987 | Dolan | E03D 9/038 |
| | | | | 4/227.6 |
| 6,654,970 | B1 * | 12/2003 | Van | E03D 9/038 |
| | | | | 4/227.1 |
| 7,073,209 | B1 * | 7/2006 | McCormick | E03D 9/033 |
| | | | | 4/227.1 |
| 7,096,515 | B2 * | 8/2006 | Navon | E03D 9/007 |
| | | | | 4/227.1 |
| 7,441,283 | B2 * | 10/2008 | Chu | E03D 9/037 |
| | | | | 4/227.1 |

\* cited by examiner

*Primary Examiner* — Lori L Baker
(74) *Attorney, Agent, or Firm* — Alphapatent Associates, Ltd; Daniel J. Swirsky

(57) ABSTRACT

A toilet tank top cover, including: a compartment for containing a liquid detergent; and a dispenser, for manually dispensing a dose of the liquid detergent from the compartment downwards into a toilet tank, being covered by the toilet tank top cover, thereby utilizing a large space of the compartment, as being adapted to a large length and a large width of the toilet tank, for dispensing the liquid detergent therefrom.

6 Claims, 4 Drawing Sheets

TOILET TANK TOP COVER

CROSS-REFERENCE TO RELATED APPLICATIONS

This application claims the benefit of priority from Israel Patent Application No. 255623, filed Nov. 13, 2017, the disclosure of which is incorporated herein by reference.

TECHNICAL FIELD

The invention relates to the field of toilets. More particularly, the invention relates to detergent dispensing thereto.

BACKGROUND

Detergent is conventionally dispensed to a toilet from a relatively small tank, and thus is disadvantaged in requiring replacing thereof from time to time.

There is a long felt need to provide a solution to the above-mentioned and other problems of the prior art.

SUMMARY

A toilet tank top cover, including:
a compartment for containing a liquid detergent; and
a dispenser,
thereby utilizing a large space of the compartment.

BRIEF DESCRIPTION OF THE DRAWINGS

Embodiments, features, and aspects of the invention are described herein in conjunction with the following drawings.

The drawings are not necessarily drawn to scale.

DETAILED DESCRIPTION

The invention will be understood from the following detailed description of embodiments of the invention, which are meant to be descriptive and not limiting. For the sake of brevity, some well-known features are not described in detail.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

Figure 1:
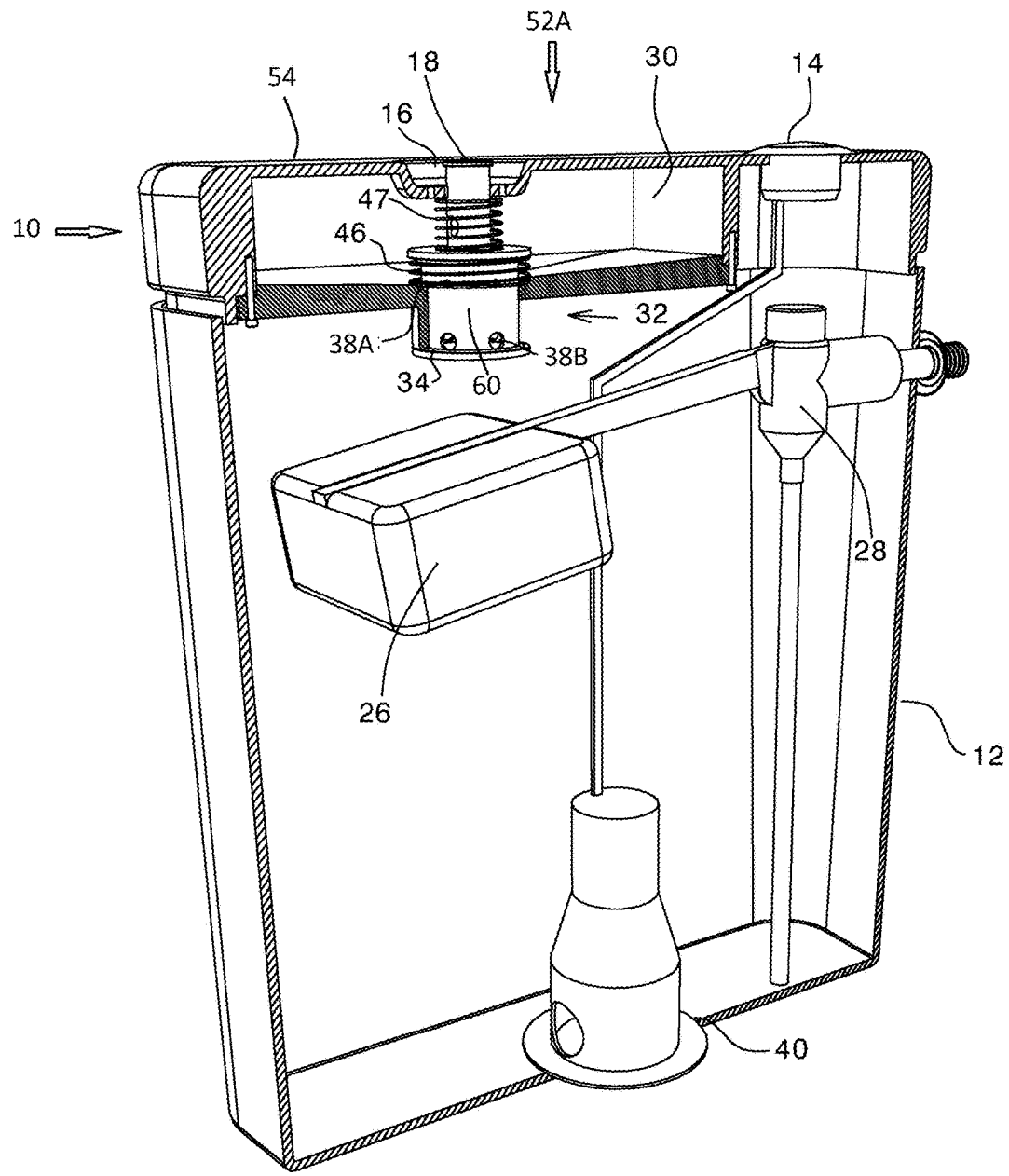
FIG. 1 is a cut sectional perspective view of a toilet tank top cover according to one embodiment of the invention at the non-pressed state of the dispenser, and the rest of the toilet tank.

FIG. 1 is a cut sectional perspective view of a toilet tank top cover according to one embodiment of the invention at the non-pressed state of the dispenser, and the rest of the toilet tank.

The prior art toilet tank top cover constitutes a plate for merely covering the top of a toilet tank 12.

In contrast to the prior art toilet tank top cover, a toilet tank top cover 10 according to one embodiment of the invention, includes, except for the top plate 54, a compartment 30, for containing a liquid detergent, for manually dispensing a dose thereof downwards into toilet tank 12.

Thus, toilet tank top cover 10 utilizes the top of toilet tank 12, as having a large surface for containing a large amount of the detergent, in spite of the small height of the top of toilet tank 12, not containing water for the flushing.

Toilet tank top cover 10 includes a liquid dispenser 32, for dispensing a dose from the liquid disposed at the bottom of compartment 30.

The dispensing is manually operated by pressing a knob 18 of liquid dispenser 32 downwards, from the non-pressed state 52A of FIG. 1.

Figure 2:
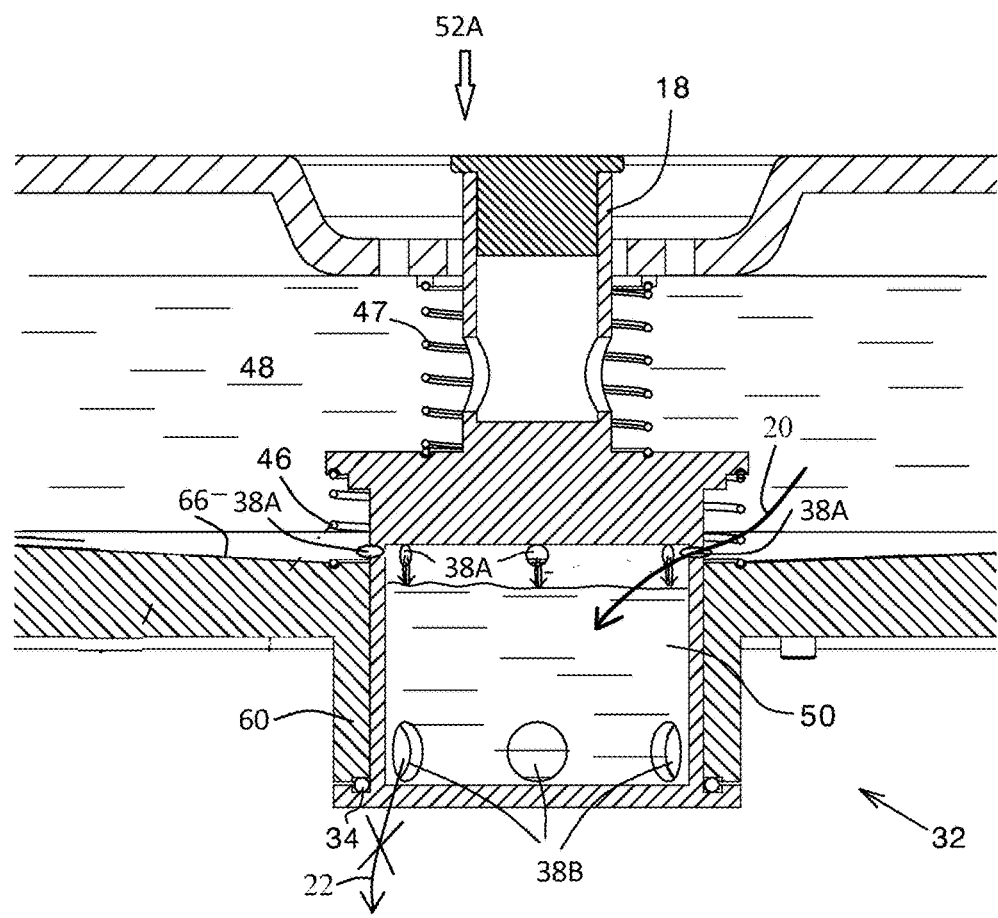
FIG. 2 is a further cut sectional view of the toilet tank top cover of FIG. 1 yet at the non-pressed state of the dispenser.
Figure 2:
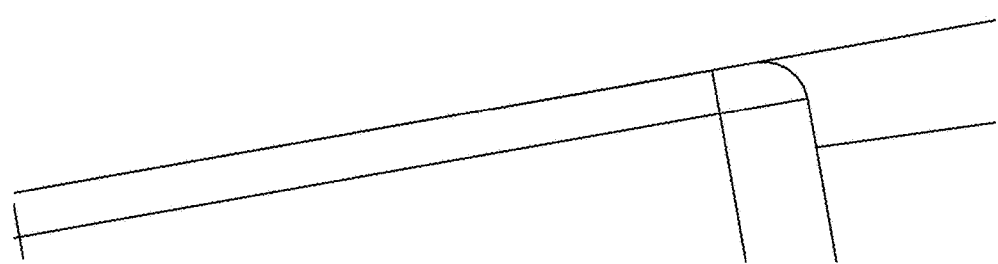

FIG. 2 is a further cut sectional view of the toilet tank top cover of FIG. 1 yet at the non-pressed state of the dispenser.

Liquid dispenser 32 includes a chamber 50 sized as one dose, and having at least one top inlet 38A, for functioning as an inlet to chamber 50; and at least one bottom inlet 38B, for functioning as an outlet from chamber 50.

At the non-pressed state 52A of dispenser 32, chamber 50 is disposed high, thus exposing inlet 38A to compartment 30. At the high position inlet 38A is open, thus liquid detergent 48 enters chamber 50 from compartment 30 by free fall of gravity only. At the non-pressed state 52A of dispenser 32, outlet 38B is closed, thus liquid detergent 48 is confined in 30 chamber 50.

The non-pressed state 52A is the normal state, and is intended to last hours or days. Thus, inlet 38A is small as shown in FIG. 2, and yet the small size thereof is sufficient for filling chamber 50 along a long time.

Figure 3:
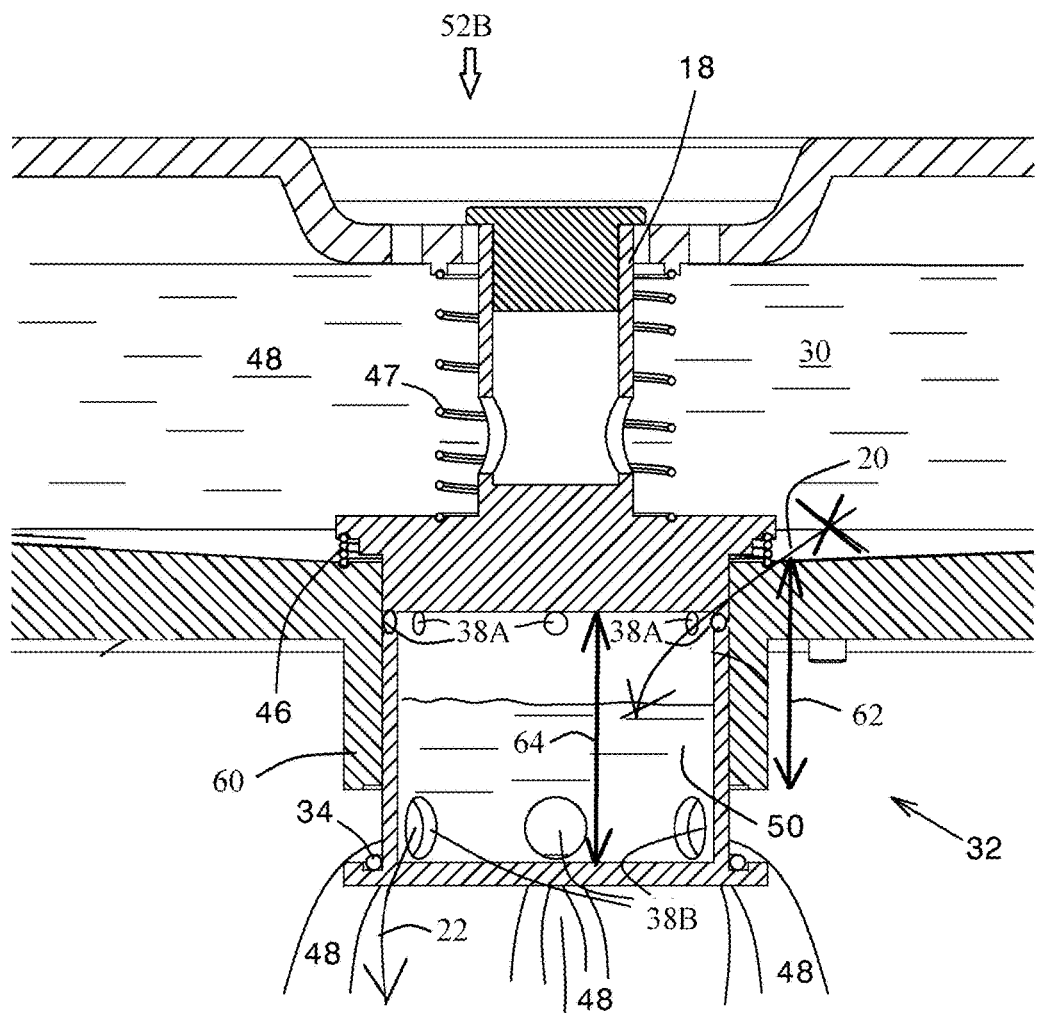
FIG. 3 is the cut sectional view of the toilet tank top cover of FIG. 2 at the pressed state of the dispenser.

FIG. 3 is the cut sectional view of the toilet tank top cover of FIG. 2 at the pressed state of the dispenser.

At the pressed state of dispenser 32, inlet 38A is closed thus not allowing entrance 20 of liquid detergent 48 into chamber 50 from compartment 30; and outlet 38B is open, thus dispensing the dose of liquid detergent 48 by gravity only.

The non-pressed state 52A is intended to last several seconds only. Thus, outlet 38B is large as shown in FIG. 3, for being sufficient to empty most or all of the content of chamber 50 by gravity only.

Dispenser 32, as lacking a pump, is thus advantaged in that frequent presses on knob 18 of liquid dispenser 32 dispense one dose only, since inlet 38A requires a long time for filling chamber 50.

Chamber 50 constitutes a piston, being slideable within a cylinder 60, for closing either inlet 38A or outlet 38B. The height 62 of cylinder 60 is smaller than the height 64 of chamber 50.

At the pressed state 52B, outlet 38B is disposed below cylinder 60, thus opening outlet 38B; and inlet 38A is disposed against the wall of cylinder 60, thus closing it.

Referring again to FIG. 2, at the non-pressed state 52A, inlet 38A is disposed above cylinder 60, thus opening inlet 38A; and outlet 38B is disposed against the wall of cylinder 60, thus closing it.

Figure 4:
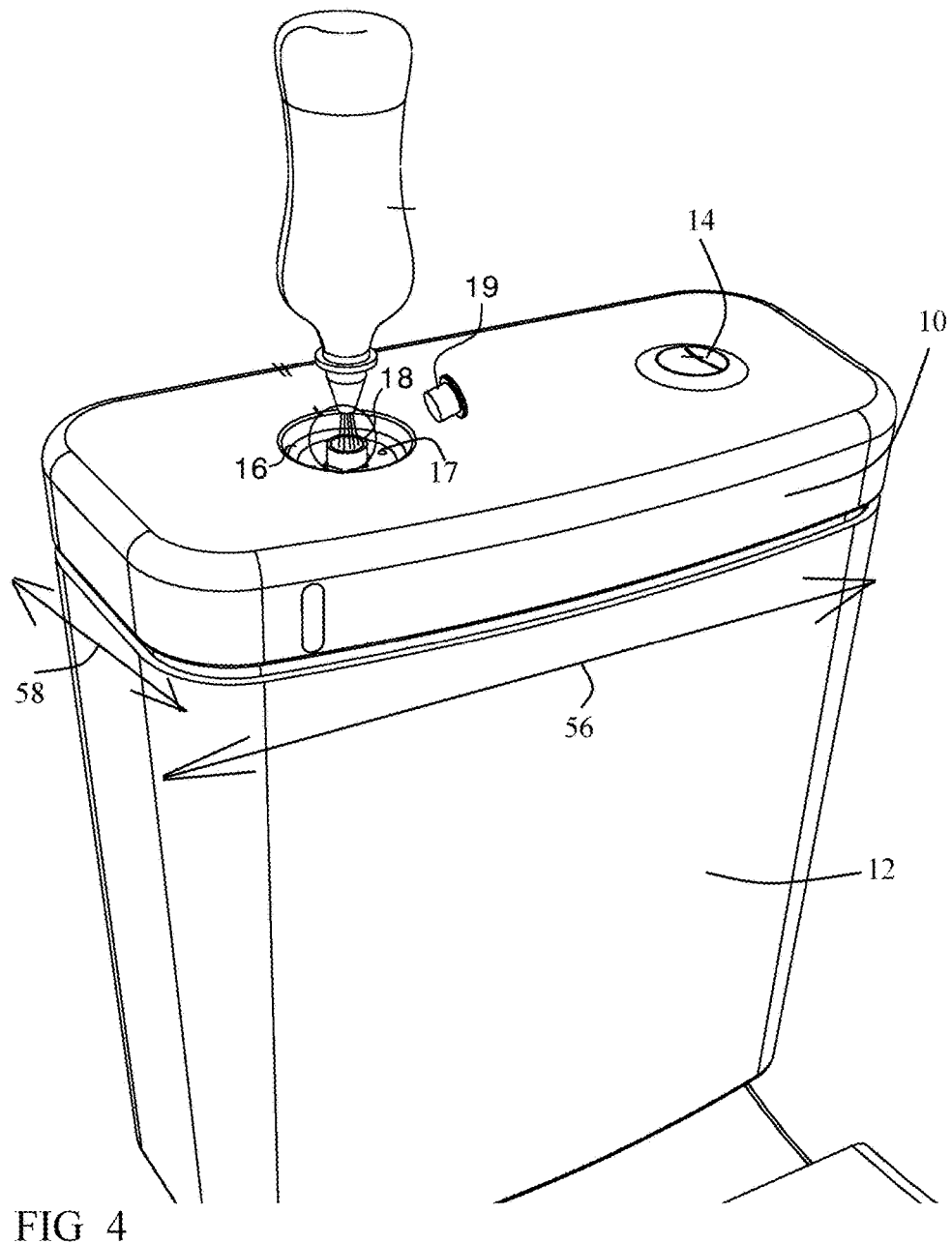
FIG. 4 is a perspective view of the toilet being covered by the toilet tank top cover of FIG. 1.

FIG. 4 is a perspective view of the toilet being covered by the toilet tank top cover of FIG. 1.

The liquid detergent may be filled from a top opening 17 of toilet tank top cover 10; and knob 18 may as well be pressed therefrom.

Thus, in one aspect, the invention is directed to a toilet tank top cover (10), including:
a compartment (30) for containing a liquid detergent (48); and a dispenser (32), for manually dispensing a dose of the liquid detergent (48) from the compartment (30) downwards into a toilet tank (12), being covered by the toilet tank top cover (10), thereby utilizing a large space of the compartment (30), as being adapted to a large length (56) and a large width (58) of the toilet tank (12), for dispensing the liquid detergent (48) therefrom.

The dispenser (32) may include a chamber (50) disposed at the bottom of the compartment (30), thereby the manual dispensing of the dose of the liquid detergent (48) downwards into the toilet tank (12) is advantaged of being received from the bottom (66) of the compartment (30).

The chamber (50) may include:

at least one inlet (38A), disposed at the top of the chamber (50), for receiving the liquid detergent (48) from the bottom (66) of the compartment (30); and at least one outlet (38B), disposed at the bottom of the chamber (50), for being closed at a non-pressed state of the dispenser (32) for not allowing dispensing, and for being open at a pressed state of the dispenser (32), thereby the dispensing applies free fall of the liquid detergent (48) from the chamber (50) by gravity rather than pumping, through the at least one outlet (38B) while being open.

The inlet (38A) is sufficiently small for increasing time required for filling the chamber (50), thereby not allowing frequent dispensing operations.

The outlet (38B) is sufficiently large for shortening the period required for emptying the chamber (50), thereby requiring a short period of the pressed state.

The dispenser (32) may further include:

a cylinder (60), for covering either the inlet (38A) or the outlet (38B), one at a time, by sliding the chamber (50) within the cylinder (60) and in relation thereto.

In the figures and/or description herein, the following reference numerals (Reference Signs List) have been mentioned:

numeral 10 denotes the toilet tank top cover according to one embodiment of the invention;
numeral 12 denotes the prior art toilet tank;
numeral 14 denotes the prior art water flushing knob;
numeral 16 denotes a depression, for accompanying pouring the liquid detergent into the top opening 17;
numeral 17 denotes a top opening, for pouring the liquid detergent into the compartment 30;
numeral 18 denotes the knob for manually lowering chamber 50;
numeral 19 denotes a cap;
numeral 20 denotes entrance into the chamber;
numeral 22 denotes exit from the chamber;
numeral 26 denotes the prior art float, for closing valve 28;
numeral 28 denotes the prior art water flushing valve;
numeral 32 denotes the dispenser, being based on gravity, rather than on pumping;
numeral 34 denotes a seal, for sealing the bottom of cylinder 60 to the bottom of chamber 50 at the non-pressed state 52A;
numeral 38A denotes the inlet of the chamber;
numeral 38B denotes the outlet of the chamber;
numeral 40 denotes the prior art bottom seal to the drain;
numerals 46 and 47 denote springs, for normally lifting chamber 50 in relation to cylinder 60 at the non-pressed state 52A;
numeral 48 denotes the liquid detergent;
numeral 50 denotes the chamber, for containing one dose;
numeral 52A denotes the non-pressed state;
numeral 52B denotes the pressed state;
numeral 54 denotes the top plate of the compartment 30;
numeral 56 denotes the length of toilet tank 12;
numeral 58 denotes the width of toilet tank 12;
numeral 60 denotes the cylinder, for closing either the inlet 38A or the outlet 38B of chamber 50;
numeral 62 denotes the height of cylinder 60;
numeral 64 denotes the height of chamber 50;
numeral 66 denotes the bottom of the compartment; this bottom is preferably sloped towards chamber 50.

The foregoing description and illustrations of the embodiments of the invention have been presented for the purpose of illustration, and are not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

What is claimed is:

1. A toilet tank top cover, comprising:
a compartment for containing a liquid detergent; and
a dispenser, for dispensing, by a single manual pressing on a knob thereof, a dose of said liquid detergent from a bottom of said compartment downwards into a toilet tank, being covered by said toilet tank top cover,
thereby said dispensing from said bottom of said compartment utilizes a large space of said compartment, as being adapted to a large length and a large width of said toilet tank, for dispensing said liquid detergent therefrom.

2. A toilet tank top cover according to claim 1, wherein said dispenser comprises a chamber disposed at said bottom of said compartment,
thereby a size of said dose is of said chamber, and
thereby said chamber provides said manual dispensing of said dose of said liquid detergent downwards into said toilet tank from said bottom of said compartment.

3. A toilet tank top cover according to claim 2, wherein said chamber comprises:
at least one inlet, disposed at a top of said chamber, for receiving said liquid detergent from said bottom of said compartment; and
at least one outlet, disposed at a bottom of said chamber, for being closed at a non-pressed state of said dispenser for not allowing dispensing, and
for being open at a pressed state of said dispenser,
thereby said dispensing comprises free fall of said liquid detergent from said chamber, through said at least one outlet while being open.

4. A toilet tank top cover according to claim 3, wherein said at least one inlet is sufficiently small for increasing time required for filling said chamber,
thereby not allowing frequent dispensing operations.

5. A toilet tank top cover according to claim 3, wherein said at least one outlet is sufficiently large for shortening a period required for emptying said chamber, thereby shortening a period of said pressed state.

6. A toilet tank top cover according to claim 3, wherein said dispenser further comprises:

a cylinder, for covering either said at least one inlet or said at least one outlet by sliding said chamber within said cylinder and in relation thereto.

* * * * *